United States Patent [19]
Christophe et al.

[11] Patent Number: 6,109,314
[45] Date of Patent: Aug. 29, 2000

[54] TAP FOR COMPRESSED OR LIQUEFIED GAS

[75] Inventors: Gilbert Christophe, Sainte-Eulalie, France; Jean-Claude Schmitz, Heisdorf, Luxembourg

[73] Assignee: Torrent Trading Ltd., Tortola, Virgin Islands (Br.)

[21] Appl. No.: 09/249,433

[22] Filed: Feb. 12, 1999

[51] Int. Cl.[7] ........................................ B65B 1/04

[52] U.S. Cl. ........................... 141/198; 141/18; 137/315; 137/446

[58] Field of Search ............................. 141/18, 198, 301, 141/302; 137/315, 444, 446

[56] References Cited

U.S. PATENT DOCUMENTS

| | | | |
|---|---|---|---|
| 3,929,155 | 12/1975 | Garretson | 137/430 |
| 4,360,038 | 11/1982 | Trinkwalder, Jr. | 137/390 |
| 5,282,496 | 2/1994 | Kerger | 141/18 |

*Primary Examiner*—Steven O. Douglas
*Attorney, Agent, or Firm*—Leydig, Voit & Mayer

[57] ABSTRACT

The tap is designed for fitting onto a gas bottle and to allow both the drawing-off of gas and the filling of the bottle. To this end, the tap includes a filling circuit communicating with the inside of the bottle via a level valve which automatically closes at a specific level and a drawing-off circuit comprising at least one retention valve (22, 32) preventing filling of the bottle via the drawing-off circuit.

6 Claims, 2 Drawing Sheets

TAP FOR COMPRESSED OR LIQUEFIED GAS

FIELD OF THE INVENTION

The present invention relates to a tap, for compressed or liquefied gas, comprising a tap body designed for fitting onto a gas bottle and containing at least one opening and closing member associated with at least one manoeuvring means and communicating via an inlet channel with the inside of the bottle in order to allow the drawing-off of gas.

BACKGROUND OF THE INVENTION

The invention relates, in particular, to taps for gas cylinders or bottles which can be refilled by the user himself at a gas-distribution point. To comply with safety regulations, when filling a bottle of this type correctly it is necessary to avoid filling the bottle completely so as to leave a gaseous zone, above the liquefied gas, which can act as a buffer in the event that the bottle is exposed to a source of heat and, optionally, be released via a safety valve. Unfortunately, these regulations are not always complied with, either because of a lack of means for monitoring during the filling or because of negligence on the part of the user, so that the safety valve is the only safety feature.

U.S. Pat. No. 5,282,496 proposes a tap which allows the gas to be drawn off and the bottle to be filled via the tap and a level valve which, during filling, automatically halts the penetration of the gas when the gas in the bottle reaches a preset level.

As the gas is drawn off via the level valve, the drawing-off rate is not very high, which means that this tap is unsuitable for industrial applications in which large quantities of gas have to be tapped off.

SUMMARY OF THE INVENTION

The object of the present invention is to provide a new tap with filling via a level valve, with automatic closing, which allows gas to be drawn off at a high flow rate.

To achieve this objective, the tap proposed by the present invention is characterized by a filling circuit communicating with the inside of the bottle via a level valve which automatically closes the filling circuit at a specific level and in that each inlet channel is associated with at least one retention valve which forces the bottle to be filled via the level valve.

According to a first embodiment, the inlet channel ends in the gaseous zone of the bottle.

According to a further embodiment, the inlet channel extending between the manoeuvring member and the level valve communicates, above the latter, with the gaseous phase via one or more radial channels and a retention valve.

The inlet channel and the radial channels preferably start from an inner chamber designed axially between the inlet channel and the level valve, whilst the retention valve may consist of flexible tabs hanging in the said chamber in front of the entrance of the radial channels and capable, through the effect of pressure differences, of obstructing these channels or of opening them up.

According to a further embodiment, the inlet channel is extended by a pipe as far as the bottom of the bottle for tapping off gas in liquid phase, whilst the retention valve is located at the lower end of the pipe.

According to a further embodiment, the tap includes two opening and closing members, one communicating with the gaseous phase and the other, via an extension pipe, communicating with the liquid phase for drawing off, as desired, in gaseous phase or in liquid phase.

Unlike the tap disclosed in the U.S. patent, in the tap according to the present invention gas is no longer drawn off, either in gaseous phase or in liquid phase, via the level valve, which allows the drawing-off rate to be increased.

Further features and characteristics of the invention will become apparent from the description of a number of preferred embodiments which are presented below with reference to the appended drawings, in which:

DETAILED DESCRIPTION OF THE PREFERRED EMBODIMENT

Figure 1:
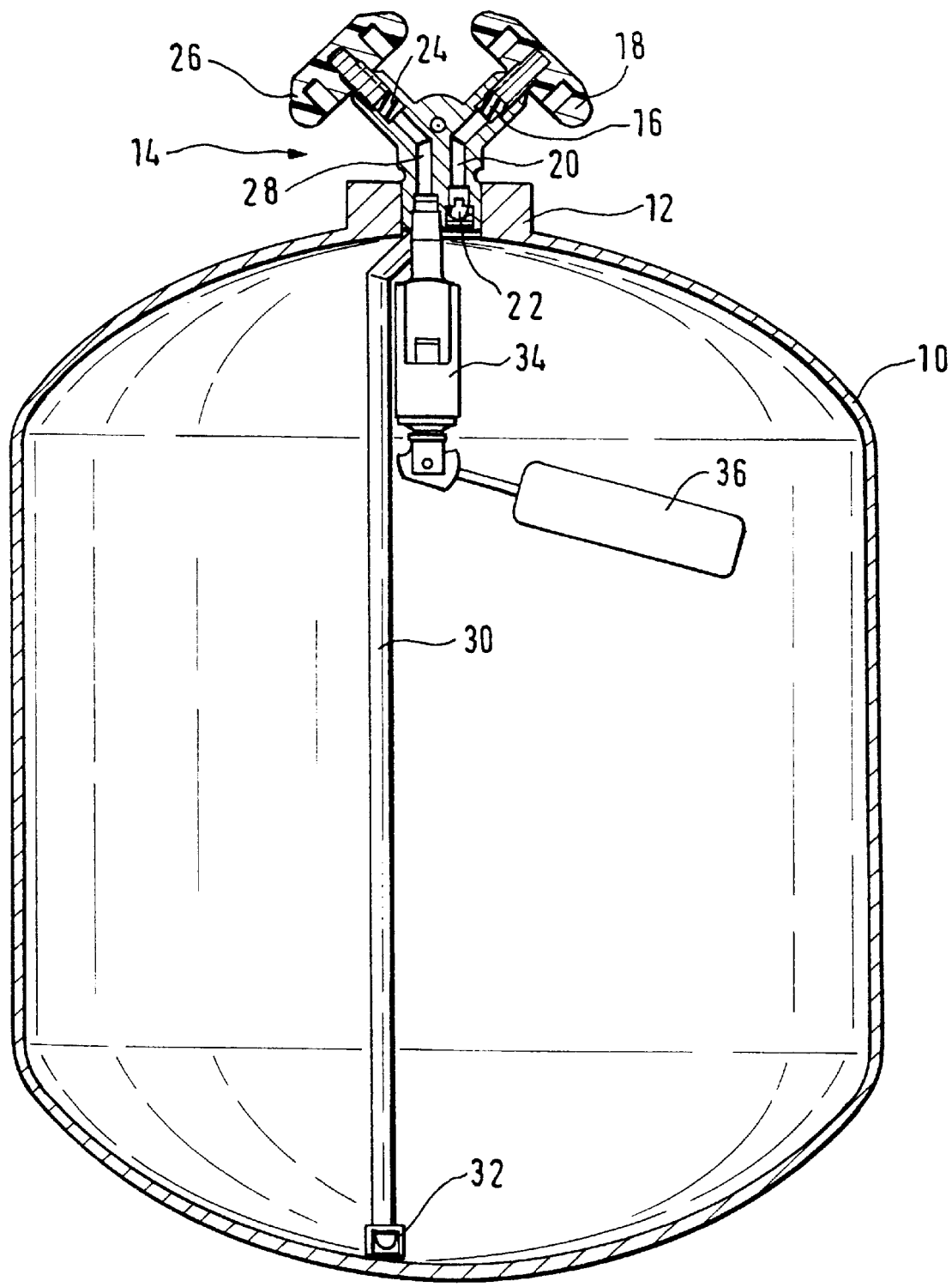
FIG. 1 diagrammatically shows a vertical section through a first embodiment.

FIG. 1 shows a gas bottle 10 with an upper neck 12 into which a tap 14 according to the present invention is screwed. In the example shown, this is a double tap 14 which allows drawing-off in gaseous phase or in liquid phase.

To this end, the tap includes a first closing member 16 actuated by a manoeuvring handwheel 18 and communicating, via an inlet channel 20 and a retention valve 22, with the upper part of the bottle 10, which is where the gaseous phase is located. The retention valve 22 prevents filling of the bottle 10 via this drawing-off circuit.

The tap also includes a second closing member 24 actuated by a second manoeuvring handwheel 26. The inlet channel 28 of this second closing member 24 is extended by a pipe 30 as far as the bottom of the bottle 10 and allows gas to be tapped off in liquid phase. The lower end of the pipe 30 is also equipped with a retention valve 32 for preventing filling of the bottle via the pipe 30.

The circuit for drawing off in liquid phase also communicates with the inside of the bottle 10 via a level valve 34, for filling the bottle. This valve 34 includes, in a manner known per se, a pivoting float 36 which, via a cam, actuates a closing member in the valve 34 to halt filling of the bottle when the level of gas in the bottle reaches a preset threshold, for example 80% full.

As the retention valve 32 prevents the penetration of gas into the bottle, the gas is forced to pass through the valve 34 when the bottle is being filled. It is thus guaranteed that the bottle cannot be filled beyond the preset threshold allowed by the level valve 34.

The description given above relates, by way of illustration, to a double tap which allows both tapping-off in liquid phase and tapping-off in gaseous phase. However, the invention is not limited to an example of this type, but also applies to a simple tap which allows tapping-off either in liquid phase or in gaseous phase.

Figure 2:
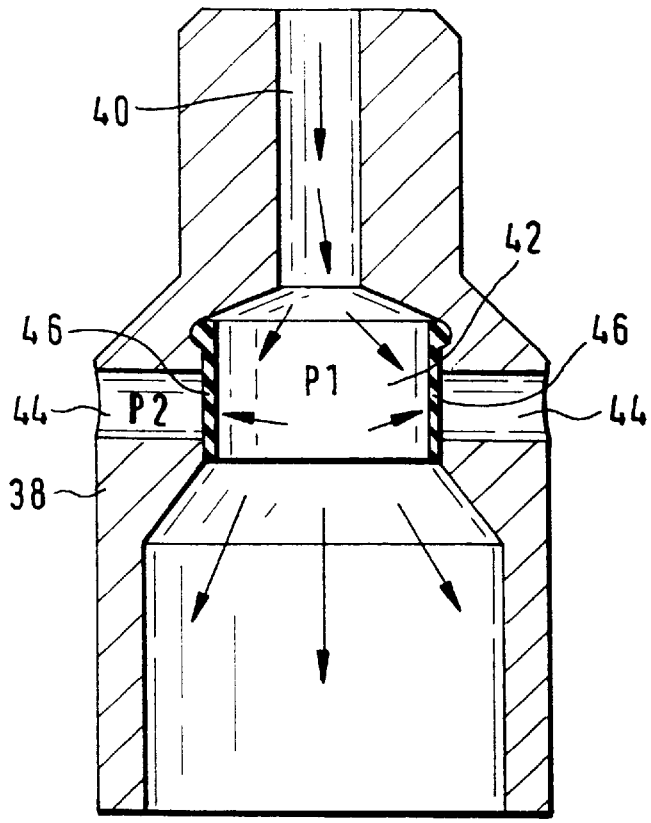
FIG. 2 shows a partial section through a second embodiment, with the retention valve in the closed position.
Figure 3:
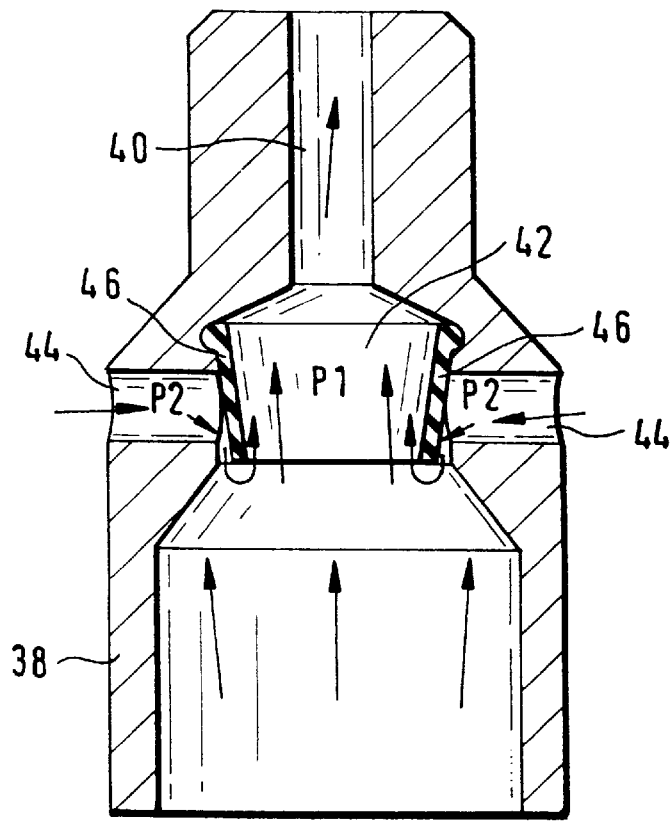
FIG. 3 shows a view similar to that of FIG. 2, with the retention valve in the open position.

FIGS. 2 and 3 illustrate an advantageous embodiment which can be applied to a simple tap, for example of the type described in the aforesaid document U.S. Pat. No. 5,282,496. In these figures, the upper part of the shell 38 of the level valve 34 may be seen (FIG. 1), with the inlet channel 40 connecting the inside of the level valve to the manoeuvring member, which is not shown.

The inlet channel 40 emerges above the level valve in an inner chamber 42 which communicates with one or more radial channels 44 through the shell 38 with the gaseous phase. The entrance of each channel 42 in the chamber is closed off by a flexible tab 46, for example made from rubber, which is suspended pivotably from the wall of the chamber above each channel, these tabs 46 forming the non-return valve.

FIG. 2 illustrates the situation when P1 inside the chamber 42 is equal to or greater than the pressure P2 of the gaseous phase around the shell, which is the case when the tap is closed respectively and principally when the bottle is being filled. This difference in pressure between P1 and P2 during filling presses the tabs 46 in a leaktight manner onto the entrances of the radial channels 44. The retention valve is thus closed and forces the gas to pass through the level valve.

When the tap is open, for gas to be drawn off, the pressure P1 in the chamber 42 drops and falls below the pressure P2. This pressure P2 causes the tabs 42 to pivot towards the inside (FIG. 3) of the chamber 42, thus allowing the gas to flow at a high rate into the chamber 42 and into the channel 40 without having to pass through the level valve.

What is claimed is:

1. Tap, for compressed or liquefied gas, comprising a tap body designed for fitting onto a gas bottle and containing at least one opening and closing member (16, 24) associated with at least one manoeuvring means (18, 26) and communicating via an inlet channel (20, 28, 40) with the inside of the bottle (10) in order to allow the drawing-off of gas, characterized by a filling circuit communicating with the inside of the bottle (10) via a level valve (34) which automatically closes the filling circuit at a specific level and in that each inlet channel (20, 28, 40) is associated with at least one retention valve (22, 32) which forces the bottle (10) to be filled via the level valve.

2. Tap according to claim 1, characterized in that the inlet channel (20) ends in the gaseous zone of the bottle (10).

3. Tap according to claim 1, characterized in that the inlet channel (28) is extended by a pipe (30) as far as the bottom of the bottle (10) for tapping off gas in liquid phase and in that the retention valve (32) is located at the lower end of the extension pipe (30).

4. Tap according to claim 1, characterized by two opening and closing members (16, 24), one communicating with the gaseous phase and the other, via an extension pipe (30), communicating with the liquid phase for drawing off, as desired, in gaseous phase or in liquid phase.

5. Tap according to claim 1, characterized in that the inlet channel (40) extending between the manoeuvring member and the level valve communicates, above the latter, with the gaseous phase via one or more radial channels (44) and a retention valve.

6. Tap according to claim 5, characterized in that the inlet channel (40) and the radial channels (44) start from an inner chamber designed axially between the inlet channel (40) and the level valve and in that the retention valve consists of flexible tabs (46) hanging in the said chamber in front of the entrance of the radial channels (44) and capable, through the effect of pressure differences, of obstructing these channels or of opening them up.

* * * * *

UNITED STATES PATENT AND TRADEMARK OFFICE
CERTIFICATE OF CORRECTION

PATENT NO. : 6,109,314
DATED : August 29, 2000
INVENTOR(S) : Gilbert Christophe, Jean-Claude Schmitz, and Jean-Marc Dickes It is certified that error appears in the above-identified patent and that said Letters Patent is hereby corrected as shown below:

On the Title Page

The third Inventor "Jean-Marc Dickes, 13, rue du Castel, B-6700, ARLON, Belgium" has been omitted from the Letters Patent and should be added.

Signed and Sealed this

Twenty-fourth Day of April, 2001

*Attest:*

NICHOLAS P. GODICI

*Attesting Officer*  *Acting Director of the United States Patent and Trademark Office*